Sept. 11, 1928.
C. G. HAWLEY
1,684,022
RECEIVER SEPARATOR
Filed May 4, 1925
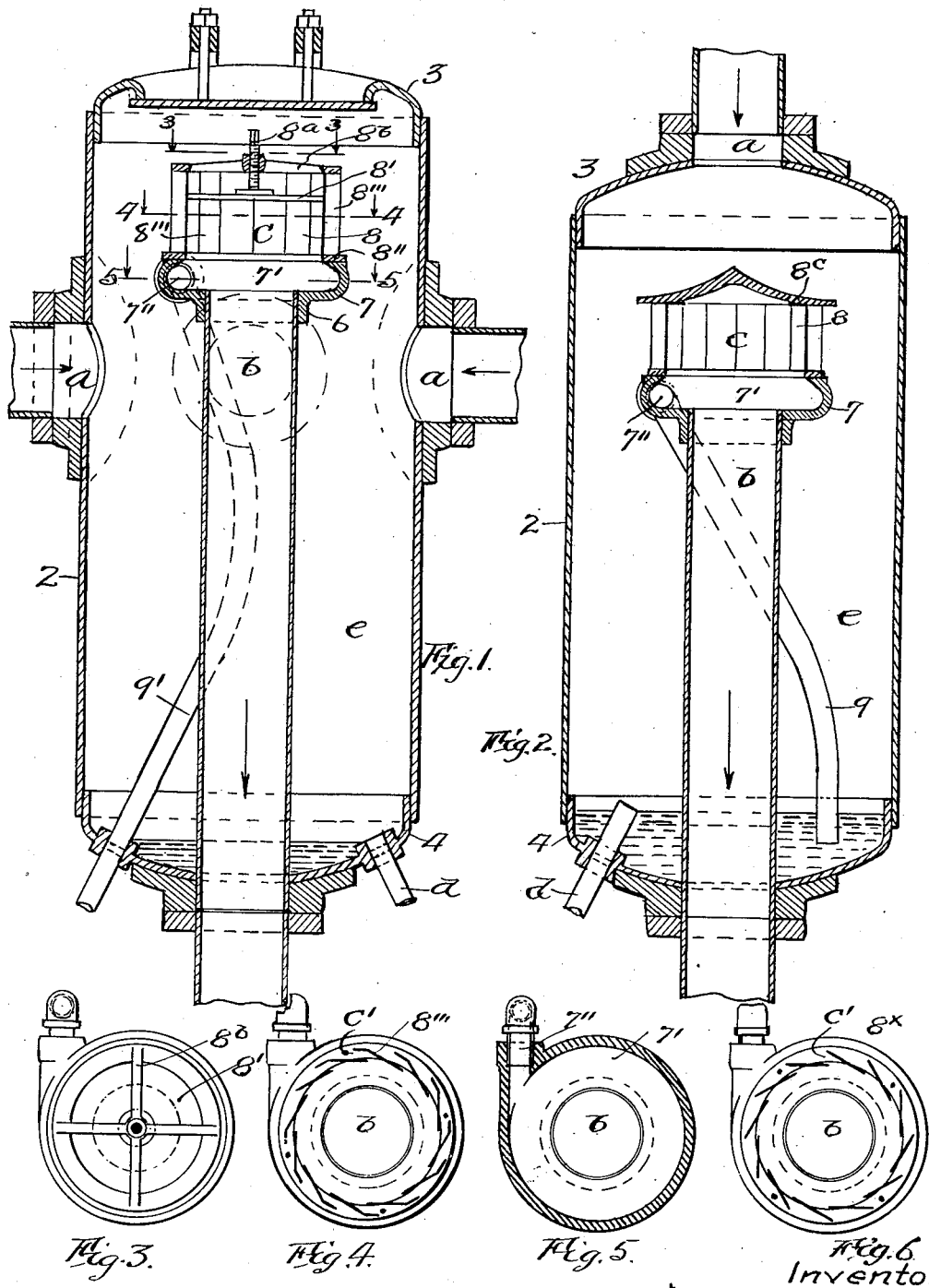
Inventor Patented Sept. 11, 1928.

1,684,022

UNITED STATES PATENT OFFICE.

CHARLES GILBERT HAWLEY, OF CHICAGO, ILLINOIS, ASSIGNOR TO CENTRIFIX CORPORATION, OF CLEVELAND, OHIO, A CORPORATION OF OHIO.

RECEIVER SEPARATOR.

Application filed May 4, 1925. Serial No. 27,848.

This invention relates to improvements in separators or purifiers for employment in steam, air and gas lines that normally contain considerable moisture and other impurities.

The object of the invention is to provide a capacious and dependable separator of the receiver type, which shall be of high efficiency and yet most simple in construction and operation.

Broadly considered, the invention comprises a pressure drum having an inlet and an outlet at the top, in combination with a centrifugal purifying device positioned within the drum at said outlet.

The invention also comprises certain valuable details of construction and specific combinations of parts, all as hereinafter described.

The invention will be readily understood on reference to the drawings that form part of this specification; in which Fig. 1 is a vertical section of a receiver separator embodying my invention; Fig. 2 illustrates a modified form of the invention; Fig. 3 is a section on the line 3—3 of Fig. 1; Fig. 4 is a horizontal section on the line 4—4 of Fig. 1; Fig. 5 is a section on the line 5—5 of Fig. 1; and Fig. 6 is like unto Fig. 4 but shows a different tuyère blading.

The pressure drum comprises the cylindrical shell 2, the top head 3, and the bottom head 4. One of these heads, or the side of the shell, should contain a man-hole through which the drum may be entered.

The pressure fluid may enter the drum at either of the openings marked $a$. It will be noted that whichever inlet is selected, it is found near, or at the top of the drum. The pressure fluid leaves the drum through the outlet $b$.

The fluid with its burden of impurities freely enters the drum and immediately deposits the greater part of its burden in the lower part of the drum. But the exit of the fluid from the drum is neither free nor unobstructed for at the outlet $b$ I interpose a centrifugal fluid purifying device or separating unit $c$ through which the fluid must pass to reach the outlet of the drum and which device or unit has the effect of depriving the fluid of the remainder of the impurities. According to design these remaining impurities are either returned to the bottom of the drum or discharge into a suitable external trap (not shown). The drum has a drain $d$ for emptying it, as by means of an automatic trap (not shown). In both forms of this separator the outlet pipe $b$ occupies the center of the drum, rises nearly to the top thereof and converts the lower part of the drum into a collecting pocket $e$.

Referring to Fig. 1 it will be seen that the auxiliary centrifugal separating device $c$ is placed upon the top of the pipe $b$ at a point above the level of the inlet $a$. In that position it is effectively hooded from the direct blast of the inflowing steam and impurities and most of the impurities are thrown down into the bottom of the drum before the fluid reaches the separator $c$. The separative device $c$ is joined to the outlet proper $b$ by a collar 6. It comprises the member 7 containing the annular race 7', and the multiple tangential tuyère member or ring 8. The internal diameter of the ring 8 is somewhat larger than that of the outlet $b$ but is smaller than the expansion race 7'. The member 8 comprises the end disk 8', the ring 8'' and the circumferential series of operatively overlapping tangential tuyère blades 8'''. The latter are well shown in Figs. 4 and 6, which also disclose the many tangential tuyères $c'$. The tuyères $c'$ have a common direction and the fluid entering there is organized into a rapidly whirling body within the ring 8 and the race 7'. By reason of this whirling motion the heavier impurities are centrifugally separated in the tuyère ring and moving downward are expansively separated in the race. From thence the impurities are discharged through the tangential nozzle 7'', going back to the bottom of the drum through a pipe 9, as shown in Fig. 2, or being externally discharged through an extension 9' of that pipe as shown in Fig. 1. If the internal delivery, 9, is employed the drain pipe $d$ should extend far enough into the drum to provide a water seal for the lower end of the pipe 9. In the above described manner the impurities are removed from the region of the outlet 6, $b$ and the purified fluid whirls away through that opening.

The top of the drum shown in Fig. 1 is provided with a man-hole and removable plate so that the separating unit $c$ is readily accessible. I take advantage of this situation to make the tuyère end 8' adjustable, the same having a threaded stem $8^a$ which is held in the top member or spider 8^b. By this means the size and volumetric capacity of the tuyères c' may be varied to suit the volume of fluid supplied through the inlet, with obvious advantage in the centrifugal operation of the unit.

The separator of Fig. 2 is adapted to receive the fluid through its top opening a. The only other difference of special note is in the tuyère top 8^c which is fixed and preferably is coned and of larger diameter than the tuyère ring 8; to the end that it may serve as a deflector and bring about an initial or a rough separation, by throwing the larger part of the impurities outward against the wall or shell of the drum, and thus prevent the slugging or overloading of the auxiliary centrifugal separator.

Having thus described my invention I claim as new and desire to secure by Letters Patent:—

1. The herein described separator comprising a vertical drum having an inlet in its upper part, in combination with an outlet pipe leading from the upper part of the drum, a volumetrically adjustable and self-contained centrifugal separating unit fixed on the top of said pipe and forming the avenue through which the fluid must pass to reach said pipe.

2. The herein described separator comprising a vertical drum having a fluid inlet in its upper part, in combination with an outlet pipe positioned vertically in said drum and leading from the upper part thereof, and a self-contained centrifugal separating unit fixed upon and supported by the upper end of said outlet pipe and forming the avenue through which the fluid must pass to reach said pipe and escape from the drum.

In testimony whereof I have hereunto set my hand this 30th day of April, A. D. 1925.

CHARLES GILBERT HAWLEY.